Aug. 1, 1950     R. D. HUSZAGH     2,516,879
THERMOSTATICALLY OPERATED ROOM VENTILATOR
Filed Aug. 23, 1946     4 Sheets-Sheet 1
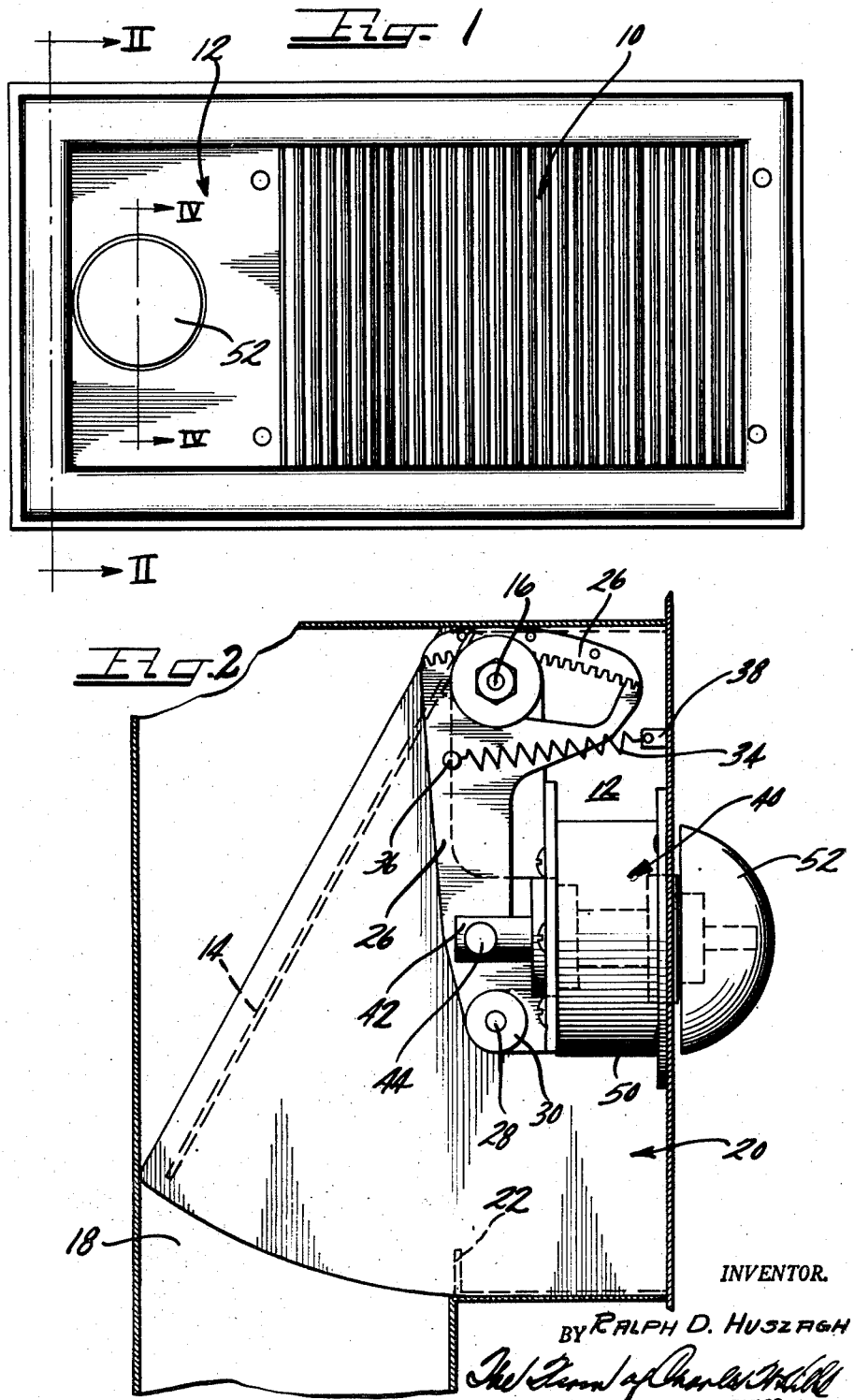
INVENTOR.
BY RALPH D. HUSZAGH
ATTYS.

Aug. 1, 1950 R. D. HUSZAGH 2,516,879
THERMOSTATICALLY OPERATED ROOM VENTILATOR
Filed Aug. 23, 1946 4 Sheets-Sheet 2
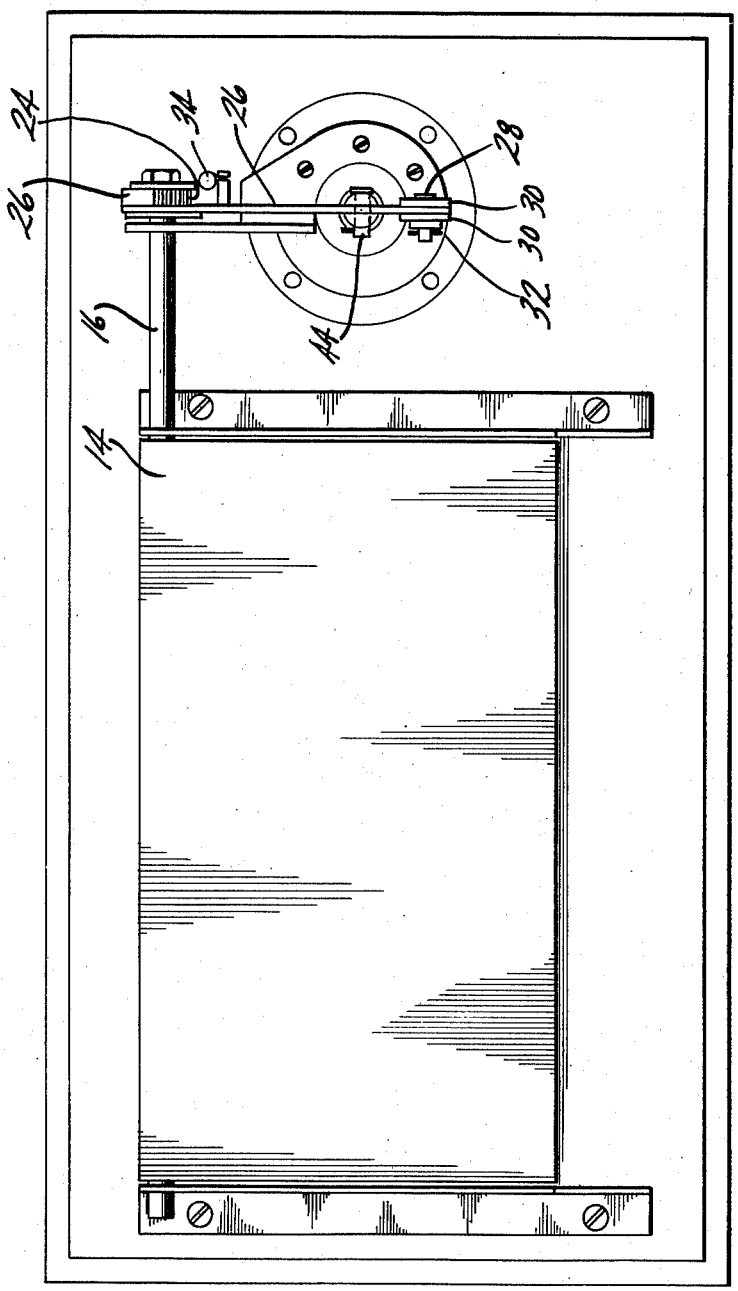
INVENTOR.
RALPH D. HUSZAGH
BY
ATTYS.

Aug. 1, 1950 R. D. HUSZAGH 2,516,879
THERMOSTATICALLY OPERATED ROOM VENTILATOR
Filed Aug. 23, 1946 4 Sheets-Sheet 3
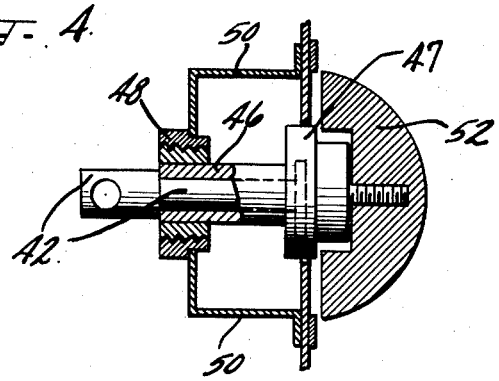
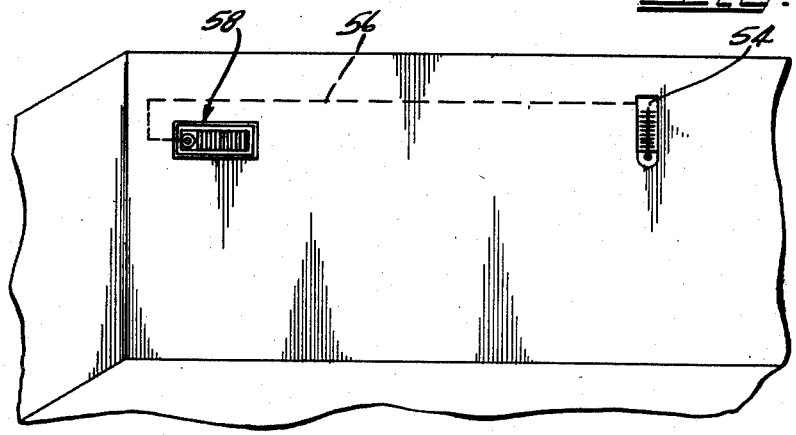
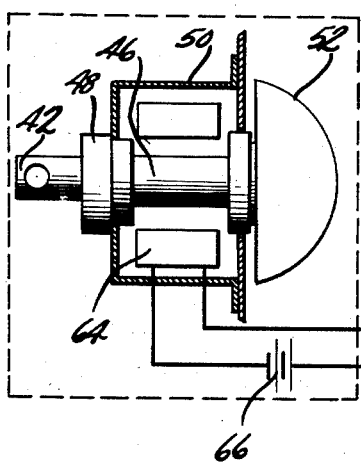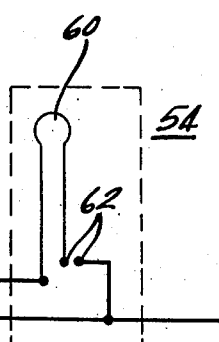
INVENTOR.
Ralph D. Huszagh
BY
ATTYS.

Aug. 1, 1950 R. D. HUSZAGH 2,516,879
THERMOSTATICALLY OPERATED ROOM VENTILATOR
Filed Aug. 23, 1946 4 Sheets-Sheet 4
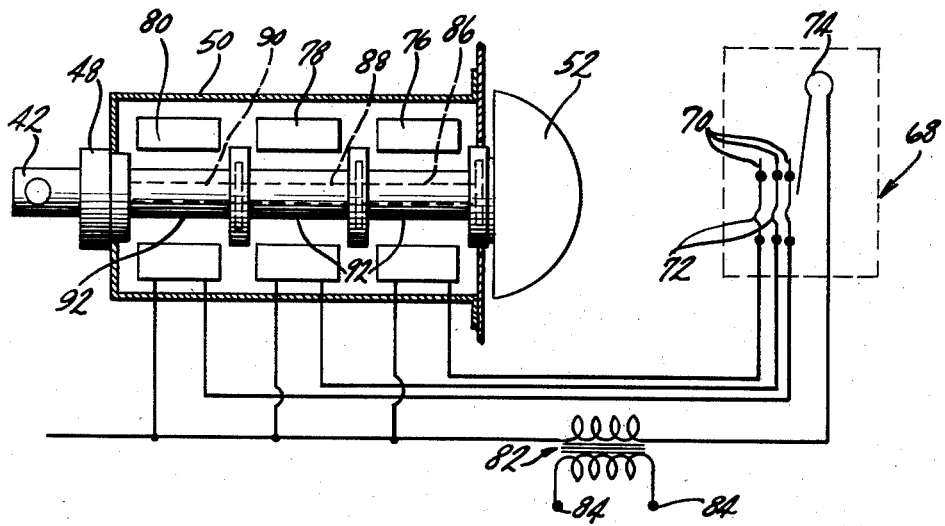
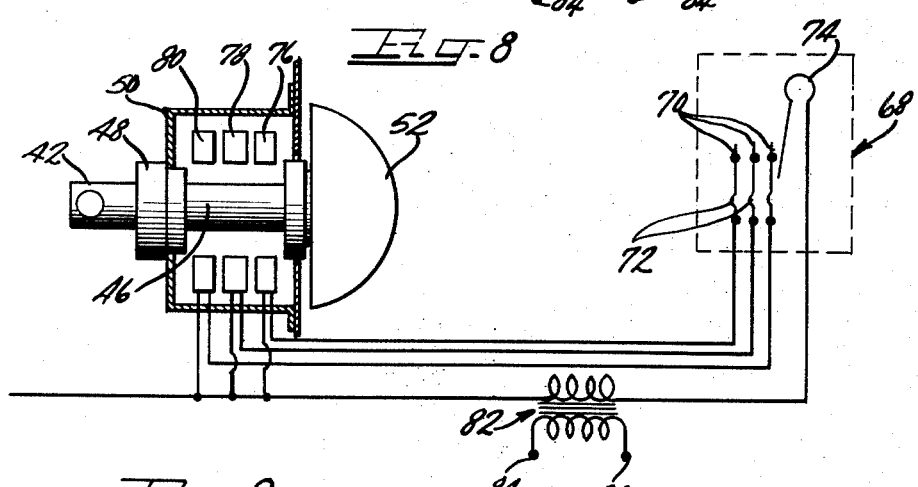
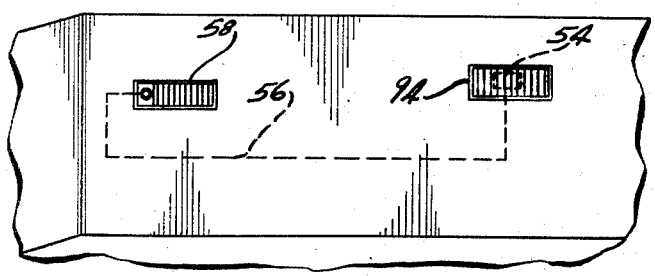
INVENTOR.
RALPH D. HUSZAGH
BY
ATTYS.

Patented Aug. 1, 1950

2,516,879

UNITED STATES PATENT OFFICE 2,516,879

THERMOSTATICALLY OPERATED ROOM VENTILATOR

Ralph D. Huszagh, Chicago, Ill., assignor to Don Manufacturing Company, Chicago, Ill., a corporation of Illinois Application August 23, 1946, Serial No. 692,583

3 Claims. (Cl. 236—68)

My invention relates to room ventilators for controlling the supply of conditioned air to a room or other space.

One of the problems associated with the application of hot or cold air room ventilating systems is that of properly controlling the passage of air from the heating or cooling unit to the room itself. Thus, in hot air heating systems it is common experience that the radiators provided to pass the heated air to the various rooms are ineffective properly to proportion the amount of heat supplied thereto. Thus, it is necessary frequently to adjust the shutters of these radiators to the end that the temperatures in the various rooms may be kept at the desired values. This constitutes a source of considerable annoyance and inconvenience to the user, particularly if a single duct contains a remote radiator at a different level in the building so that to increase the heat supply to one room, the inhabitant must change the setting of a radiator in a room far distant therefrom.

In one method of automatically controlling the supply of conditioned air to a room, the position of a control shutter, and hence the air supply to the room, is varied in accordance with the room temperature. Thus, in a hot air heating system, as the room temperature increases the shutter is automatically closed whereas as the room temperature decreases the shutter is opened. By providing automatic means to accomplish this result on all the radiators in the various rooms or other spaces to be heated, the heated air is automatically distributed in accordance with the various room temperatures, and no manual adjustment is required.

It is an object of my invention to provide an improved thermostatically controlled room ventilator.

It is a further object of my invention to provide an improved thermostatically controlled room ventilator capable of being controlled by a temperature sensitive element having small motion with variation in temperature.

Further it is an object of my invention to provide an improved room ventilator having features of construction, combination and arrangement wherein a simple and inexpensive structure is provided and in which friction losses are minimized to the end that a thermostatic control element having small changes in length with temperature shall be capable of opening and closing a large shutter.

Another object of my invention is to provide a simple and effective automatically controlled room ventilator which may be controlled from a temperature sensitive device located some distance therefrom but having no mechanical connection thereto.

Still another object of my invention is to provide a remote controlled room ventilator using a temperature sensitive element and having graduated control over a predetermined temperature range.

Yet another object of my invention is to provide a remote controlled room ventilator responsive to average room temperature and using a temperature sensitive device.

The novel features which I believe to be characteristic of my invention are set forth with particularity in the appended claims. My invention, itself, however, both as to its organization and method of operation, together with further objects and advantages thereof, may best be understood by reference to the following description taken in connection with the accompanying drawing:

On the drawing:

Figure 1 is a front view of a room ventilator constructed in accordance with my invention;

Figure 2 is an enlarged sectional view taken through section II—II of Figure 1;

Figure 3 shows an enlarged back view of the ventilator of Figure 1;

Figure 4 is an enlarged sectional view of the thermostat control element of the device of Figure 1 and taken through section IV—IV, Figure 1;

Figure 5 is a view showing a modification of my invention connected for remote control;

Figure 6 shows a cross sectional view of the thermostat control element and the wiring connections of the device of Figure 5;

Figures 7 and 8 show alternate constructions of the embodiment of my invention of Figure 6, and, Figure 9 shows an alternate arrangement of the embodiment of my invention of Figure 5.

As shown on the drawing:

In the front view of Figure 1, the louvers of the ventilator are indicated generally at 10 whereas the control portion thereof is indicated generally at 12. It is the purpose of the louvers to permit flow of air into the room from the ducts to which the ventilator is connected whereas the control portion determines the amount of air so admitted.

The structure of the room ventilator is further evident from examination of Figure 2 which shows a cross section view taken through the axis II—II, Figure 1. In this view the control portion 12 is seen directly and behind it the remainder of the equipment. The latter portion of the equipment includes shutter 14 which is connected to shaft 16 so as to rotate therewith, thus causing the position of shutter 14 to vary as shaft 16 is rotated. In the open position shown in Figure 2, shutter 14 permits flow of conditioned air from the inlet duct, shown generally at 18, to the outlet duct, shown generally at 20, from the latter duct through louvers 10 to the room. When shutter 14 is in the closed position, it is vertically disposed with respect to shaft 16 and coacts with projection 22 in outlet duct 20 so as to prevent flow of air therethrough and thus stop the flow of conditioned air to the room.

The structure for rotating shutter 14 will be evident from examination from Figures 2 and 3, the latter showing a rear view of the room ventilator with inlet duct 18 removed. As shown in these figures, pinion 24 is mounted on shaft 16 so that rotation of the pinion causes corresponding rotation of the shaft and motion of shutter 14. Internal gear 26 is provided to coact with pinion 24 and is pivotally mounted about its center by shaft 28 which is held in place by washers 30 and cotter pin 32. The shutter 14 is biased to the open position by spring 34 which coacts with anchors 36 and 38 to tend to cause internal gear 26 to assume the position shown in Figure 2. In this position, pinion 24 is rotated to its limit of travel in the clockwise direction.

The natural tendency of shutter 14 to assume an open position by reason of biasing spring 34 is opposed by the thermostatic control mechanism shown generally at 40. As will be described in further detail hereafter, this mechanism causes member 42 to move increased distances to the left as the temperature is increased. Inasmuch as member 42 is pivotally connected to internal gear 26 by pin 44, this motion causes corresponding angular motion of internal gear 26 and corresponding operation of shutter 14.

It will be evident from inspection of Figure 2 that I have provided a simple and convenient mechanism for converting the relatively small linear motion of member 42 to relatively large motion of shutter 14, and variation in the quantity of air admitted to the room. This results in part from the lever action of internal gear 26 which is fulcrumed about pin 28 and is moved by member 42 to achieve a resultant linear motion of the end of internal gear 26 of much greater amount than the motion of member 42. This motion is further amplified by the coaction of pinion 24 with internal gear 26 inasmuch as the rotational motion of shutter 14 about the axis of shaft 16 is relatively great as compared with the rotational motion of internal gear 26. Thus the ventilator may be regarded as having two degrees of amplification of motion and for that reason is capable of operating even though the actual linear movement of member 42 is very small.

The structure of the thermostat control mechanism, shown generally at 40, Figure 2, may best be understood by reference to Figure 4 which shows a sectional view through the line IV—IV, Figure 1. As shown in Figure 4, member 42 is connected to housing 46 which is in threaded engagement with member 48 which in turn is connected to the body of the room ventilator by member 50. Members 50 further act as a housing for the complete unit. Housing 46 is further arranged to be rotated relative to member 48 by dial 52 so as to adjust the position of member 42 relative to the ventilator structure, thereby enabling adjustment of the room air supply for any particular length of the control element and hence any particular room temperature.

The housing 46 contains a thermostatic control element capable of moving member 42 to the left as the temperature thereof is increased. Elements of this type are well known in the art, one type consisting of the so-called Vernet element in which the change in volume in the material results from the transformation thereof from one state to another over a particular temperature range. It is, of course, a well known fact that a change of volume takes place in most materials when the material changes from a solid to a liquid state or from a liquid to a gaseous state or a change occurs in the crystal structure thereof and if such change takes place over a predetermined temperature range, an element constructed of that material will undergo a corresponding length change. Such material may therefore be located within portion 47 of housing 46 as shown by the dotted lines of Figure 4 so as to cause member 42 to move to the left and relative to housing 46 as the temperature increases.

The operation of the room ventilator of Figures 1, 2, 3 and 4 may now be described. As warm air is first supplied through duct 18, the housing 46 has a relatively low temperature and member 42 does not overcome the tension of spring 34. Thus internal gear 26 is caused to assume the position shown in Figure 2 where shutter 14 is open and air from duct 18 can pass through duct 20 and out through louvers 10. As this air flow continues, the room temperature increases and the temperature of control element 40 is correspondingly raised. The member 42 thus moves to the left and causes corresponding motion of pin 44. This motion takes place in opposition to spring 34 and causes internal gear 26 to rotate pinion 24 and shutter 14 in the counterclockwise direction. This reduces the space available for air flow from duct 18 to duct 20, thereby decreasing the air supplied to the room. Should the room temperature become too high, member 42 stops all air supply to the room by rotating shutter 14 to engagement with stop 22. It will be understood, of course, that actually the room temperature will rise to the point at which the amount of air permitted to flow from duct 18 to duct 20 is just that required to maintain the temperature of control unit 40 at the value corresponding to the position of shutter 14. Under this condition, external influences tending to heat or cool the room merely initiate compensatory changes in the position of shutter 14.

It will be obvious that when dial 52 is rotated, thereby causing member 42 to have a different position relative to the ventilator structure for any particular temperature, the regulated temperature achieved by the unit is varied. If, for example, dial 52 is rotated so as to move member 42 to the left as shown in Figure 4, shutter 14 has a more nearly closed position at any one temperature and the regulated room temperature is correspondingly reduced. On the other hand, if dial 52 is rotated so as to move member 42 to the right, the regulated temperature is increased.

Figures 5 and 6 show an alternative construction of my improved ventilator suitable for use in situations wherein remote control of the room temperature is desired. As shown diagrammatically in Figure 5, a remote control thermostat 64 is provided at some location in the room wherein a desired temperature is to be maintained. This thermostat is connected by electrical wiring 56 to the ventilator, shown generally at 58. Figure 6 shows the detailed structure of the remote thermostat and the control portion of ventilator 58. As shown in Figure 6, thermostat 54 consists of a bimetal element 60 which comprises two bars of metal having different temperature coefficients of expansion so that as the members are heated or cooled they move relative to each other and cause contact 62 to open or close, contact 62 closing as the temperature increases. The thermostat control element used in the ventilator 58 is identical with that shown in Figure 4 except that heating coil 64 is provided and is connected in circuit with battery 66 so that when contacts 62 are closed heat is supplied to the housing 46 whereas when contacts 62 are open, no heat is supplied thereto.

In the operation of the alternative form of my invention shown in Figures 5 and 6, when the temperature at thermostat 54 exceeds a predetermined amount contacts 62 are closed, thereby connecting heating element 64 in the circuit of battery 66 and causing housing member 46 to be artificially heated. This increases the temperature of member 46 and moves member 42 to the left. As this member is located in a structure similar to that of Figures 1, 2, and 3, the movement of member 42 causes the shutter 14 to close, thereby preventing admission of more heated air to the room. On the other hand, as the room cools, members 62 lose contact with each other due to the movement of bimetal element 60 and the supply of heat due to coil 64 is removed. Control member 46 accordingly decreases in temperature and contracts so as to cause member 42 to move to the right as shown in Figure 6 and Figure 2. This causes shutter 14 to open, thereby supplying heated air to the room and increasing the temperature thereof.

Further alternate constructions of the embodiments of my invention shown in Figure 6 are shown in Figures 7 and 8. In these figures the room ventilator is arranged for remote control in a manner similar to the embodiment of Figure 6 but greater refinement of control is achieved by using a control thermostat 68 having a plurality of contacts 70 located on adjacent leaf springs 72. As the bimetal element 74 increases in temperature, an electrical connection is made between it and the first of contacts 70. Further heating causes contact between the element 74 and both the first and second of the contacts 70 whereas additional heating causes all three contacts 70 to be connected to each other and to the bimetal element 74. Heating coils 76, 78, and 80 are each connected to one of contacts 70 so that when element 74 successively contacts these contacts, the coils are connected in the series with the secondary winding of transformer 82. Terminals 84 of the primary winding of transformer 82 may be connected to a source of alternating voltage, such as the house electrical supply circuit, thus producing induced voltages in the secondary winding to heat coils 76, 78, and 80 when connected to that winding by contacts 70 and bimetal element 74.

In the embodiment of my invention shown in Figure 7, the coils 76, 78, and 80 operate to increase the temperature of temperature sensitive elements 86, 88, and 90 respectively. These are located within a common housing 92 which is positioned with respect to housing 50 by a screw thread engagement with member 48 such as that shown in Figure 4. Hence as coils 76, 78, and 80 are successively heated, member 42 is moved to successively increasing distances and the shutter of the room ventilator correspondingly closed. It will be apparent that this structure provides increased mechanical energy for the operation of the shutter, thereby enabling control of a larger shutter than could otherwise be used.

In the embodiment of my invention shown in Figure 8, the coils 76, 78, and 80 operate to heat the single temperature sensitive element 46. In this case increased total heating of the coils results in greater temperature of that element and hence increased motion of member 42 and corresponding closing of the shutter of the room ventilator.

Figure 9 shows an alternate embodiment of the form of my invention shown in Figure 5. In this case, the thermostat control element 54 is located in outlet duct 94 rather than at a particular point in the room. Inasmuch as the air temperature in the outlet duct corresponds to the integrated or average temperature of the air throughout the room, the opening and closing of the shutter of room ventilator 58 corresponds with that temperature rather than the air at a particular point as in the case of the embodiment of Figure 5. This arrangement is therefore desirable in those cases where the average room temperature rather than the temperature at a particular point is to be maintained constant.

It will be observed that in the embodiments of my invention shown in Figures 5 to 9 a remote controlled room ventilator is provided which takes advantage of the characteristics of a temperature sensitive element such as a Vernet element to control the admission of air to the room. This construction has the advantage of improved simplicity and reliability of operation over the use of a motor or other device to actuate the shutter of the ventilator in accord with temperature at a remote point. Furthermore, the expense of the installation is greatly reduced as inherently simple electrical wiring is used and the cost of the control elements is much less than that of corresponding motors. Yet another advantage resides in the fact that the heating coils may be applied to standard room ventilators of the construction shown in Figures 1 to 4, thereby taking advantage of mass production of these units to reduce the cost of the remote control units.

It is the purpose of spring 34, Figure 2, continually to urge member 42 to the right, thus urging shutter 14 to the open position. This is particularly desirable inasmuch as most thermostat control elements of the Vernet or similar types are capable of producing considerable expansive force but are incapable of producing pulling or tension force. As will be evident from examination of Figure 2, there is no need for tensile stress within the element connected to member 42 inasmuch as spring 34 provides the necessary pull. In effect, member 42 merely overcomes to a greater or lesser degree the natural bias of spring 34.

While I have shown particular embodiments of my invention, it will, of course be understood that I do not wish to be limited thereto since many modifications and alternative constructions may be made without departing from the spirit or scope thereof. I, of course, contemplate by the appended claims to cover any such modifications as fall within the true spirit and scope of my invention.

I claim as my invention:

1. In combination, a room ventilator having a duct for conditioned air in communication with said room and a shutter to open and close said duct, temperature responsive means to actuate said shutter, said means including temperature sensitive elements having length varying with temperature and disposed so as to open and close said shutter in accordance with length variations and in direction to maintain constant the temperature of said elements, a plurality of heating coils disposed about said elements so that said elements partake of the average temperature of said coils, and means selectively to heat said coils, said means heating said coils when the temperature at a remote point in said room exceeds a predetermined value, said last means causing a progressively greater number of said coils to be heated as the temperature at said remote point increases, whereby said temperature responsive means is correspondingly heated and the air supply from said duct varied accordingly.

2. In combination, a room ventilator having a duct for conditioned air in communication with said room and a shutter to open and close said duct, temperature responsive means to actuate said shutter, said means including a plurality of temperature sensitive elements having length varying with temperature and disposed so as to open and close said shutter in accordance with their total length and in direction to maintain constant the temperature of said elements, a plurality of heating coils disposed about said elements so that said elements partake of the average temperature of said coils, and means selectively to heat said coils, said means heating said coils when the temperature at a remote point in said room exceeds a predetermined value, said last means causing a progressively greater number of said coils to be heated as the temperature at said remote point increases, whereby said temperature responsive means is correspondingly heated and the air supply from said duct varied accordingly.

3. A room ventilator to admit controlled quantities of conditioned air from a duct to a room or the like comprising in combination, a housing defining an air passage from said duct to said room, a shutter to control air flow through said passage, a shaft, means connecting said shutter to said shaft to close or open said passage as said shaft is rotated, a pinion mounted for rotation with said shaft, a gear in operative engagement with said pinion, whereby rotation of said gear opens and closes said shutter, means pivotally supporting said gear for rotational movement to open and close said shutter, and means supported from said housing to rotate said gear in accord with room temperature, said means including an arm supported for shifting movement to rotate said gear and temperature sensitive elements having length varying in accord with temperature operable to shift said arm in a direction to close said shutter as the room temperature increases, and manually operable means for relative adjustment of said arm to vary the position of said shutter in conformance with predetermined room temperatures.

RALPH D. HUSZAGH.

REFERENCES CITED

The following references are of record in the file of this patent:

UNITED STATES PATENTS

| Number | Name | Date |
|---|---|---|
| 1,756,688 | Hutchinson | Apr. 29, 1930 |
| 1,783,574 | Lawler | Dec. 2, 1930 |
| 1,996,237 | Folds | Apr. 2, 1935 |
| 2,122,050 | Stuart | June 28, 1938 |
| 2,240,354 | Smith | Apr. 29, 1941 |

FOREIGN PATENTS

| Number | Country | Date |
|---|---|---|
| 444,387 | Great Britain | Mar. 19, 1936 |